US012472576B2

(12) United States Patent
Wimmer

(10) Patent No.: US 12,472,576 B2
(45) Date of Patent: Nov. 18, 2025

(54) METHOD FOR PRODUCING A PIPE FITTING, IN PARTICULAR BY WELD OVERLAY

(71) Applicant: Linde Aktiengesellschaft, Munich (DE)

(72) Inventor: Georg Wimmer, Tuessing (DE)

(73) Assignee: Linde Aktiengesellschaft, Munich (DE)

( * ) Notice: Subject to any disclaimer, the term of this patent is extended or adjusted under 35 U.S.C. 154(b) by 464 days.

(21) Appl. No.: 16/638,335

(22) PCT Filed: Aug. 13, 2018

(86) PCT No.: PCT/EP2018/025213
§ 371 (c)(1),
(2) Date: Feb. 11, 2020

(87) PCT Pub. No.: WO2019/034288
PCT Pub. Date: Feb. 21, 2019

(65) Prior Publication Data
US 2020/0254551 A1 Aug. 13, 2020

(30) Foreign Application Priority Data
Aug. 16, 2017 (DE) .......................... 102017007734.7

(51) Int. Cl.
| | |
|---|---|
| *B23K 9/04* | (2006.01) |
| *B23K 9/173* | (2006.01) |
| *B23K 15/00* | (2006.01) |
| *B23K 26/342* | (2014.01) |
| *B23K 101/06* | (2006.01) |
| *B23K 103/04* | (2006.01) |

(Continued)

(52) U.S. Cl.
CPC .............. *B23K 9/048* (2013.01); *B23K 9/173* (2013.01); *B23K 15/0086* (2013.01);
(Continued)

(58) Field of Classification Search
CPC ................................ B33Y 70/00; B33Y 80/00
See application file for complete search history.

(56) References Cited

U.S. PATENT DOCUMENTS 5,620,652 A * 4/1997 Tack ....................... C22C 21/16
420/544
2015/0000108 A1 1/2015 Hascoet et al.
(Continued)

FOREIGN PATENT DOCUMENTS

| FR | 2 324 405 A1 | 4/1977 |
| GB | 2 452 774 A | 3/2009 |

OTHER PUBLICATIONS

International Search Report of the International Searching Authority for PCT/EP2018/025213 with mailing date of Dec. 7, 2018.
(Continued)

*Primary Examiner* — Elizabeth M Kerr
(74) *Attorney, Agent, or Firm* — Millen, White, Zelano & Branigan; Ryan R. Pool

(57) ABSTRACT

The invention relates to a process for producing a pipe fitting (10), for example a reduction piece, a pipe elbow or a branch, wherein a metallic material (11) is melted by heating, and wherein a plurality of material layers (12) is produced in a successive manner from the melted material (11), wherein the in each case produced material layer (12) is materially bonded to the in each case previous material layer (12), and wherein the pipe fitting (10) is formed from the material layers (12) bonded to one another. The pipe fitting (10) is produced by buildup welding, for example arc welding or beam welding.

8 Claims, 4 Drawing Sheets

(51) Int. Cl.
- *B23K 103/10* (2006.01)
- *B33Y 10/00* (2015.01)
- *B33Y 70/00* (2020.01)
- *B33Y 80/00* (2015.01)
- *F16L 21/00* (2006.01)
- *F16L 41/02* (2006.01)
- *F16L 43/00* (2006.01)
- *B23K 103/14* (2006.01)

(52) U.S. Cl.
CPC ............ *B23K 26/342* (2015.10); *B33Y 10/00* (2014.12); *B33Y 70/00* (2014.12); *B33Y 80/00* (2014.12); *B23K 2101/06* (2018.08); *B23K 2103/04* (2018.08); *B23K 2103/10* (2018.08); *B23K 2103/14* (2018.08); *F16L 21/002* (2013.01); *F16L 41/02* (2013.01); *F16L 43/001* (2013.01)

(56) References Cited

U.S. PATENT DOCUMENTS

| | | | |
|---|---|---|---|
| 2015/0165684 A1* | 6/2015 | Deane | B33Y 50/02 700/98 |
| 2016/0107265 A1 | 4/2016 | Lin et al. | |
| 2016/0199914 A1* | 7/2016 | Potter | F16L 9/18 419/7 |
| 2017/0002978 A1 | 1/2017 | Ballinger et al. | |
| 2017/0016096 A1* | 1/2017 | Wentland | C22C 21/14 |
| 2018/0147669 A1* | 5/2018 | Narayanan | B23K 26/0006 |

OTHER PUBLICATIONS

English translation of International Search Report of the International Searching Authority for PCT/EP2018/025213 with mailing date of Dec. 7, 2018.

* cited by examiner

METHOD FOR PRODUCING A PIPE FITTING, IN PARTICULAR BY WELD OVERLAY

The invention relates to a process for producing a pipe fitting, for example for pipes and pressure vessels, in particular through additive manufacture using a buildup welding process.

Pipe fittings for medium-guiding pipes and pressure vessels with or without internal pressure loading, for example composed of the materials aluminum, non-, low- and high-alloy steel, nickel compounds, titanium, or further non-ferrous metals and non-ferrous metal alloys, are produced according to the prior art by forging, casting, flanging from a pipe, or welding together of individual segments.

The production of said fittings is limited according to material and requirements for the component geometry. The geometry conforms in many cases to the restrictions of the production process and not to the requirements with regard to flow behavior and force flow in the case of internal pressure loading.

In many case, the production of fittings using the methods of the prior art is cumbersome or very difficult. This is the case for example for fittings composed of aluminum, in particular of aluminum alloys with a magnesium content of more than 2.5%. For example, in the case of the production of conical fittings from the aluminum alloy 5083, the reject rate is very high owing to the susceptibility to cracks with high deformation.

It is therefore the object of the present invention to provide a process which is improved with regard to the stated disadvantages of the prior art.

Said object is achieved by the process as defined in the claims. Advantageous embodiments of the process are specified in dependent claims. These are described below.

The invention relates to a process for producing a pipe fitting, wherein a metallic material is melted by heating, and wherein a plurality of material layers is produced in a successive manner from the melted material, wherein the in each case produced material layer is materially bonded to the in each case previous material layer, and wherein the pipe fitting is formed from the material layers bonded to one another.

The process according to the invention is in particular an additive manufacturing process. In particular here, the metallic material is applied by means of buildup welding (also referred to as cladding) to the workpiece (that is to say the unfinished pipe fitting during manufacture), and the pipe fitting is thereby formed. The buildup welding can be performed for example by means of arc welding or beam welding, in particular laser beam welding or electron beam welding.

During arc welding, an electric arc (that is to say an electrical discharge) is generated between a welding electrode and a counter electrode and releases heat that causes the workpiece to be welded to melt at the position of the electric arc. The workpiece is often used as a counter electrode. Arc welding may be performed under a protective gas atmosphere so as to avoid oxidation of the workpiece by way of the electric arc.

During beam welding, a laser beam or electron beam is directed at the workpiece, and thereby locally heats the latter such that the workpiece melts at the corresponding position.

In the context of the present invention, the term "pipe fitting" is to be understood as meaning an at least sectionally tubular part of a pipe for guiding fluid media in the interior pipe space or of a pressure vessel for receiving a fluid medium. Here, the term "tubular" means that the corresponding section is of hollow-cylindrical form along a longitudinal axis, wherein in particular, the section perpendicular to the longitudinal axis has a substantially circular or elliptical cross section. The interior space of the pipe is in this case configured to guide a fluid (that is to say liquid or gaseous) medium. Pipe fittings may in particular be reducers, pipe elbows, branches, T-pieces, Y-pieces, bushings, U-pipes (also referred to as siphons) and pipe connecting pieces.

Furthermore, in the context of the present invention, a "metallic material" is to be understood as meaning a material which is formed from a metal, that is to say from an element which can be found in the periodic table below a separating line from boron to astatine, and materials composed of alloys or intermetallic phases of such metals. Such metallic materials have, in solid or liquid form, the characteristic properties of high electrical conductivity, high thermal conductivity, ductility (deformability) and metallic gloss (mirror finish).

In the context of the present invention, the term "melting" means that, by way of the heating, the material is made sufficiently flowable that the material can form a material layer and can be materially bonded to the in each case previous material layer.

The in each case produced material layer is materially bonded to the in each case previous material layer. It goes without saying here that, at the start of the process according to the invention, there is firstly formed a first material layer to which a second material layer is subsequently materially bonded. The first material layer may be formed for example on a support, wherein the support consists of matter which, under the conditions of the process, does not bond to the material, with the result that the finished pipe fitting can be released from the support after the process has ended.

By contrast to the processes of the prior art, the production process according to the invention offers the possibility of optimizing the stated pipe fittings with respect to the flow properties of the medium flowing in the pipe and to the force flow in the case of internal pressure loading of the pipe or pressure vessel. This is the case in particular if use is made of aluminum-magnesium alloys with a magnesium content of more than 2.5% by weight as the material, since pipe fittings can be manufactured from such materials only with difficulty using the methods of the prior art.

Furthermore, the process according to the invention results in improved possibilities for the choice of material with required geometries, for example such that use may also be made of aluminum-magnesium alloys with a magnesium content of more than 2.5% by weight as material without relatively great manufacturing problems.

Moreover, in comparison with the prior art, the stated pipe fittings can, with the process according to the present invention, be produced less expensively.

According to one embodiment, an electrical voltage is provided, or applied, between a welding electrode and a counter electrode such that an electric arc is formed between the welding electrode and the counter electrode, wherein the material is melted by means of the heat generated by the electric arc, and wherein the in each case produced material layer is materially bonded to the in each case previous material layer by means of the heat generated by the electric arc. Use is therefore made in this case of an arc welding process.

According to a further embodiment, the welding electrode is formed from the material, wherein at least one electrode section of the welding electrode is melted by means of the heat generated by the electric arc, and wherein the plurality of material layers is formed from the melted electrode section of the welding electrode.

Here, the welding electrode is formed in particular from a wire of the material. In particular here, that end of the wire at which, upon application of a voltage, the electric arc is formed melts away and forms a drop of liquid material, wherein the drop, as part of the material layer formed during the respective process step, is brought to a corresponding position of the workpiece. At said position, the drop is in this case materially bonded to the material layer situated below, which is likewise melted locally by the electric arc, and finally cools. During the continuous melting-away of the wire end, the wire can be replenished by the side opposite the end such that the distance between the welding electrode and the workpiece remains constant during the process. It goes without saying that it is possible for the welding electrode or the wire to be replaced even during the process (for example if the welding electrode has melted away too much to perform the process), so that the workpiece is formed in a successive manner from the matter of multiple welding electrodes or wires. As the counter electrode, use may be made here for example of the workpiece (that is to say the unfinished pipe fitting) or a separate counter electrode.

As a alternative to a welding electrode composed of the material, it is also possible for example for use to be made of a non-melting welding electrode (for example composed of tungsten). In this case, the material is fed separately, for example as powder which is applied to the material and then melted by means of the electric arc.

According to a further embodiment, a laser beam or electron beam is provided, wherein the material is melted by means of the heat generated by the laser beam or electron beam, and wherein the in each case produced material layer is materially bonded to the in each case previous material layer by means of the heat generated by the laser beam or electron beam.

In the stated embodiment, a beam welding process is therefore used. In such beam welding processes too, it is possible for the material to be provided in the form of a wire. In this case, a wire section of the wire (for example the end) is situated in the heating region of the laser beam or electron beam such that said wire section is melted on account of the heat released by the laser beam or electron beam. Here, the corresponding wire section may be situated for example in the beam path of the laser beam or electron beam.

Alternatively, in the case of use of a beam welding process, the material may also be provided in the form of a powder which is applied to the workpiece and is melted by means of the laser beam or electron beam.

According to a further embodiment, the material is provided in the form of a wire, wherein at least one wire section, in particular one end of the wire, is melted by heating, and wherein the plurality of material layers is formed from the melted wire section of the wire, wherein in particular, the welding electrode is formed from the wire.

According to a further embodiment, the material is provided in the form of a powder, wherein the powder is applied to the in each case previous material layer, and wherein the powder is melted by heating such that the respective material layer is formed and is materially bonded to the in each case previous material layer.

According to a further embodiment, the material is selected from the group consisting of aluminum, an aluminum alloy, nickel, a nickel alloy, titanium, a titanium alloy and steel.

According to a further embodiment, the material is an aluminum alloy with a proportion by weight of magnesium of at least 2.5%.

Such materials are particularly difficult to process to form pipe fittings using the existing methods of the prior art.

According to a further embodiment, the pipe fitting is formed as a reduction piece, in particular a conical reduction piece, a pipe elbow or a branch.

The term reduction piece (also referred to as reducer) describes here a pipe fitting which has along its direction of longitudinal extent two ends with different nominal diameters. Such reduction pieces may be used in particular for connecting pipes of different nominal diameters or pipe inner diameters. The term "conical reduction piece" refers to a reduction piece which has along its direction of longitudinal extent a truncated cone section between its ends, wherein the nominal diameter changes in the region of the truncated cone section. In particular, the conical reducer is a concentric reducer, that is to say said truncated cone has a circular base. A conical reducer for which the truncated cone has a non-circular base is referred to as an eccentric reducer.

According to a further embodiment, the pipe fitting is formed as a reduction piece, wherein the ratio between the nominal diameters of the ends of the reduction piece is at least 1.1 to 1, in particular 1.5 to 1 to 2 to 1, preferably 1.5 to 1.

In the context of the present invention, the term "pipe elbow" refers to a curved pipe fitting, wherein it is possible in particular to realize a change in direction of a pipe by way of a corresponding pipe fitting.

According to a further embodiment, the pipe fitting is formed as a pipe elbow, wherein the pipe fitting has, in particular along a pipe extent, a curvature with a radius of curvature of 2000 cm or less, in particular 1000 cm or less, preferably 500 cm or less. Here, the term "pipe extent" refers in particular to the flow direction of a fluid guided in the pipe interior space.

In the context of the invention, the term "branch" (also referred to as pipe branch) means a pipe fitting with a junction that is designed such that, at the junction, it splits the stream of a fluid guided in the pipe fitting or, at the junction, it merges two streams into one stream. Here, the pipe fitting has a first pipe section, which extends along a first longitudinal axis, and a second pipe section, which extends along a second longitudinal axis, wherein the first and second pipe sections are connected in terms of flow at said junction. The pipe sections or longitudinal axes extend at an angle to one another, and are thus not parallel to one another. The pipe sections may extend for example at an angle of 90° to one another. Such branches are in particular referred to as T-pieces. Alternatively, obtuse or acute angles between the pipe sections are of course also possible. The latter branches are in particular also referred to as Y-pieces.

According to a further embodiment, the pipe fitting has a compressive strength of at least 10 bar, in particular at least 100 bar.

According to a further embodiment, the pipe fitting has a compressive strength of at least 10 bar, at least 20 bar, at least 30 bar, at least 40 bar, at least 50 bar, at least 60 bar, at least 70 bar, at least 80 bar, at least 90 bar or at least 100 bar.

What is meant here by the term "compressive strength" is the property of the pipe fitting to remain dimensionally stable in the case of a corresponding internal pressure of a fluid guided in the pipe interior space.

Further exemplary embodiments of the invention will be described below on the basis of drawings, in which FIG. 1 shows a conical reduction piece produced by the process according to the invention;

Figure 1:
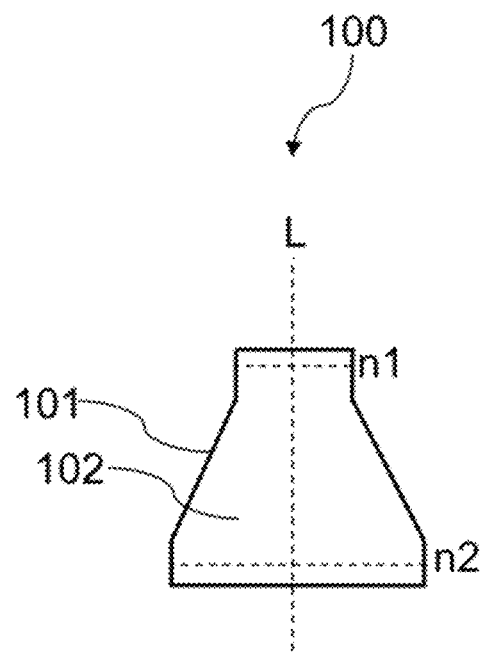

FIG. 1 shows a schematic cross-sectional illustration of a reduction piece 100 composed of a metallic material, which is produced by the process according to the invention. The reduction piece 100 extends in a tubular manner along a longitudinal axis L, and has a wall 101 (in the circumferential direction with respect to the longitudinal axis L) and an interior space 102 surrounded by the wall 101 and serving for guiding a fluid medium. In particular, the reduction piece 100 in this case has, perpendicular to the longitudinal axis L, a circular cross section.

Furthermore, the reduction piece 100 has, at a first end, a first nominal diameter n1 (that is to say an extent of the pipe interior space 102 perpendicular to the longitudinal axis L, in particular a pipe inner diameter) and has, at a second end, a second nominal diameter n2, with the second nominal diameter n2 being greater than the first nominal diameter n1.

The reduction piece 100 is of conical form, that is to say the wall 101 forms a truncated cone. The conical reducer shown in FIG. 1 is a concentric reducer, that is to say said truncated cone has a circular base. With the process according to the invention, it is alternatively also possible for eccentric reduction pieces 100 to be produced, that is to say conical reducers for which the truncated cone has a non-circular base.

The reduction piece 100 may be used in particular for connecting pipes or pressure vessels of different nominal diameters or pipe inner diameters.

Figure 2:
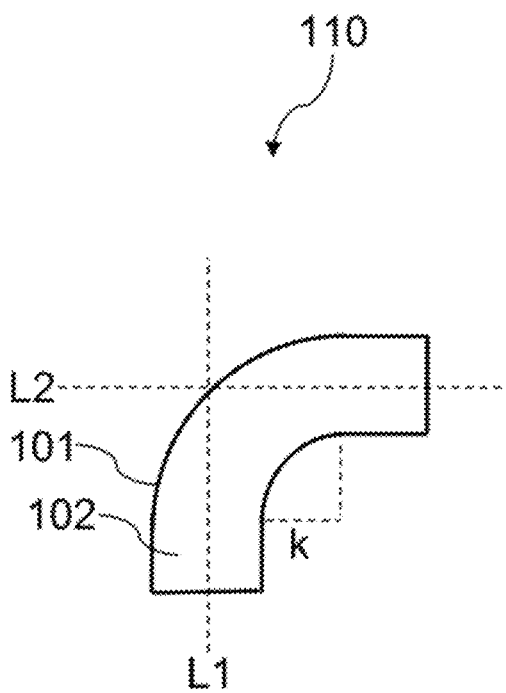
FIG. 2 shows a pipe elbow produced by the process according to the invention.

FIG. 2 shows a schematic cross-sectional illustration of a pipe elbow 110 composed of a metallic material, which is produced by the process according to the invention. The pipe elbow 110, too, has a wall 101 and an interior space 102 surrounded by the wall 101 and serving for guiding a fluid medium.

The pipe elbow 110 has a curved section, with a radius of curvature k, a first end section, which extends along a first longitudinal axis L1, and a second end section, which extends along a second longitudinal axis L2. In the example shown here, the first longitudinal axis L1 and the second longitudinal axis L2 extend perpendicular to one another. It goes without saying, however, that angles between the first longitudinal axis L1 and the second longitudinal axis L2 that differ from 90° are also conceivable. Here, by connecting two pipe ends or pressure vessel ends to such a pipe elbow 110, it is possible in particular for a change in direction of a pipe or a pressure vessel to be realized.

Figure 3:
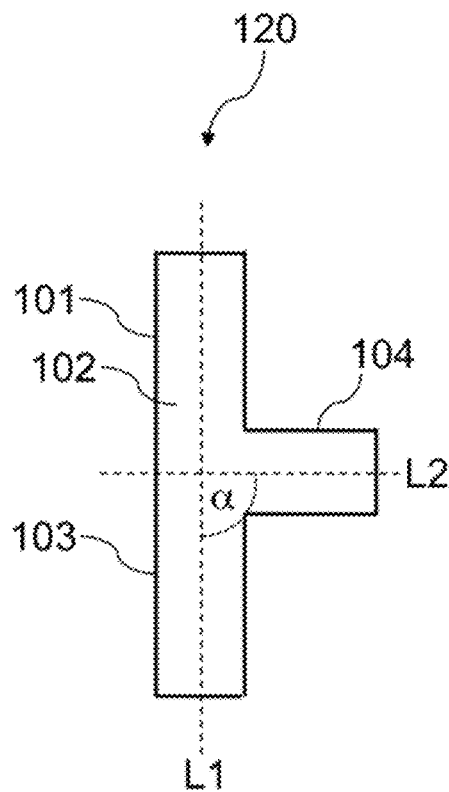
FIG. 3 shows a branch produced by the process according to the invention.

FIG. 3 shows a schematic cross-sectional illustration of a branch 120 composed of a metallic material, which is produced by the process according to the invention. The branch 120 likewise has a tubular wall 101 which surrounds an interior space 102, wherein the branch 120 is designed to guide a fluid in the interior space 102.

Furthermore, the branch 120 has a first pipe section 103 and a second pipe section 104, wherein the first pipe section 103 extends along a first longitudinal axis L1 and the second pipe section 104 extends along a second longitudinal axis L2. The first pipe section 103 opens into the second pipe section 104, with the result that a fluid flowing in the interior space 102 of the branch 120 can be split at the junction between the first pipe section 103 and the second pipe section 104 or, in the case of an opposite flow direction, can be merged. The branch 120 may be used in particular for splitting or merging, according to flow direction, fluid streams guided in a pipe or a pressure vessel.

The first pipe section 103 and the second pipe section 104 extend at an angle α to one another. In the case of the branch 120 illustrated in FIG. 3, the angle α is 90°. Such branches 120 are also referred to as T-pieces. With the process according to the invention, it is of course also possible for branches 120 with acute or obtuse angles α between the first pipe section 103 and the second pipe section 104 to be produced. Such branches 120 are in particular also referred to as Y-pieces.

Figure 4:
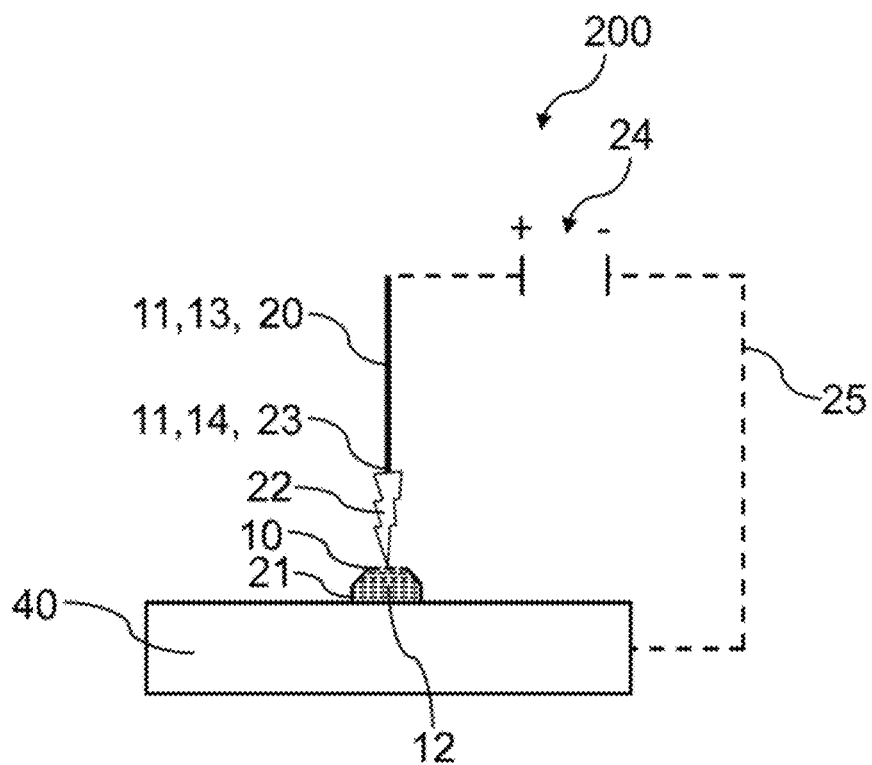
FIG. 4 shows a schematic illustration of a first embodiment of the process according to the invention by means of arc welding, with material fed as a wire.
Figure 5:
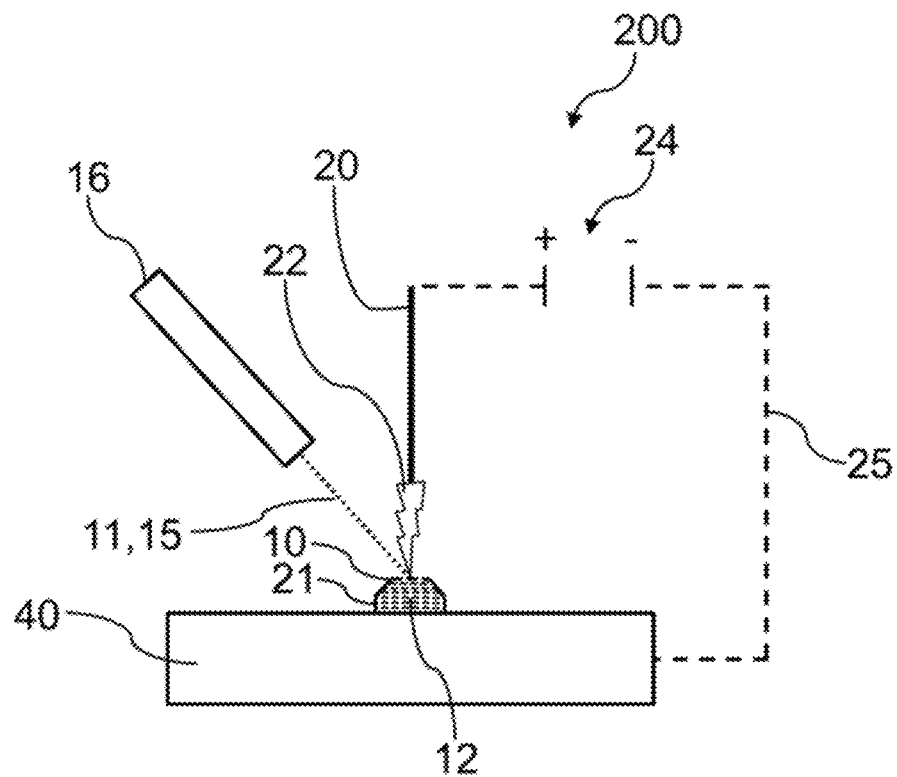
FIG. 5 shows a schematic illustration of a second embodiment of the process according to the invention by means of arc welding, with material fed in powder form.

FIGS. 4 and 5 schematically illustrate embodiments of the process according to the invention in which the material 11 is fed by means of arc welding to the workpiece 10, that is to say to the partly finished pipe fitting 10, during the process.

The pipe fitting 10 or the workpiece 10 is positioned on a support 40. FIGS. 4 and 5 furthermore show a device 200 for arc welding (for example metal welding with inert gases, MIG, or metal active gas welding, MAG), having a welding electrode 20 which is connected in an electrically conductive manner to a voltage source 24 via an electrical line 25. The voltage source 24 is furthermore connected in an electrically conductive manner to the support 40 via an electrical line 25. The metallic pipe fitting 10 or the workpiece 10 can in this case be connected in an electrically conductive manner to the voltage source 24 via the support 40 and the electrical line 25, with the result that the workpiece 10 can function as a counter electrode 21. In this way, by providing an electric voltage at the voltage source 24, an electric field can be generated between the welding electrode 20 and the counter electrode 21 such that an electric arc 22 forms between the welding electrode 20 and the counter electrode 21. Alternatively, the device 200 for arc welding may have a separate counter electrode 21, which is connected in an electrically conductive manner to the voltage source 24 via the electrical line 25.

In the embodiment illustrated in FIG. 4, the welding electrode 20 is designed as a wire 13, wherein the wire 13 is formed from the material 11. By means of the heat generated by the electric arc 22, a wire section 14 or electrode section 13, in this case one end of the wire 13, is melted, wherein the melted material 11 is applied as a material layer 12 to the workpiece 10. During the formation of the respective material layer 12 (that is to say the in each case topmost layer), the workpiece 10 and the welding electrode 20 are moved in particular in relation to one another such that said material layer 12 is applied in a targeted manner at different positions of the surface of the workpiece 10. In this case, either the workpiece 10 or the welding electrode 20 or the device 200 can be moved.

The wire 13 melting away on the wire section 14 is replenished in particular by that end of the wire 13 opposite the wire section 14 such that, in particular, the position of the wire section 14 remains constant during the process.

FIG. 5 schematically illustrates an analogous process according to the invention in which the device for arc welding 200 (for example metal welding with inert gases, MIG, or metal active gas welding, MAG) has a welding electrode 20 which is formed not from the material 11 but rather in particular from matter which is non-meltable (at the temperatures which are able to be generated by the electric arc 22), for example tungsten. In this embodiment, the material 11 from which the material layers 12 of the workpiece 10 are formed is fed to the workpiece 10 in the form of a powder 15 by means of a powder source 16. Here, the powder 15 is melted by the heat generated by means of the electric arc 22.

FIGS. 4 and 5 each illustrate the welding electrode 20 as an anode and the counter electrode 21 as a cathode. This corresponds to the polarity normally used in MIG welding and MAG welding. The polarity of the welding electrode 20 and the counter electrode 21 may also be reversed, however.

Figure 6:
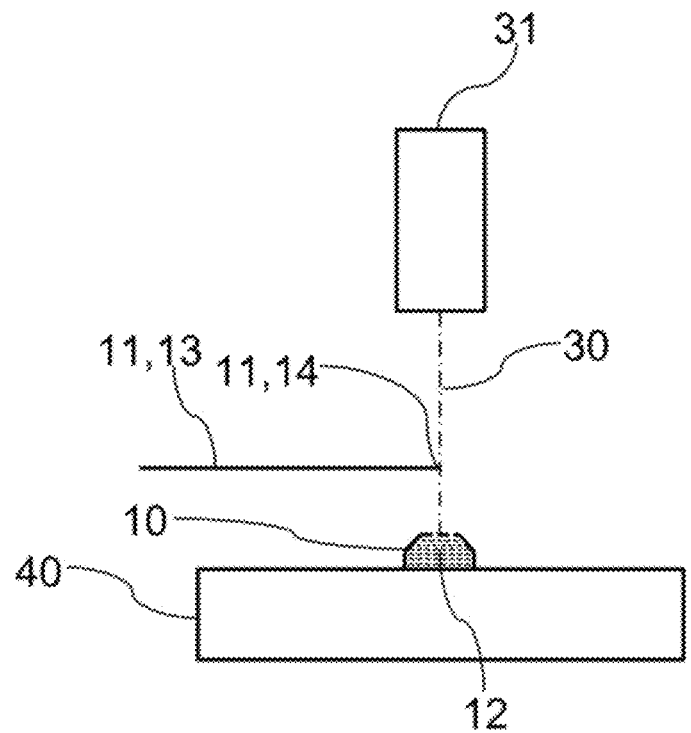
FIG. 6 shows a schematic illustration of a third embodiment of the process according to the invention by means of beam welding, with material fed as a wire.
Figure 7:
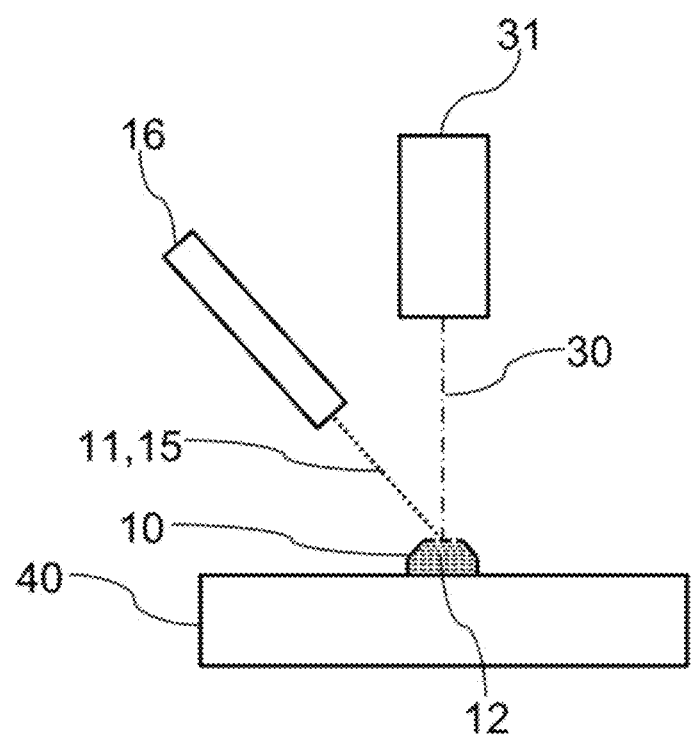
FIG. 7 shows a schematic illustration of a fourth embodiment of the process according to the invention by means of beam welding, with material fed in powder form.

FIGS. 6 and 7 schematically show further embodiments of the process according to the invention by means of beam welding, that is to say for example laser welding or electron beam welding.

Analogously to the embodiments shown in FIGS. 4 and 5, the pipe fitting 10 or the workpiece 10 is in this case positioned on a support 40. Instead of the device 200 for arc welding, in the embodiments of the process shown in FIGS. 6 and 7, provision is made of a laser source or electron source 31, which produces a laser beam or electron beam 30.

In the embodiment shown in FIG. 6, the material 11 is provided in the form of a wire 13 analogously to the process shown in FIG. 4. Here, a wire section 14, in particular one end of the wire 13, is melted by means of the laser beam or electron beam 30 such that the respective material layer 12 of the workpiece 10 is formed from the melted material 11.

In this embodiment too, the wire 13 melting away on the wire section 14 is in particular replenished by that end of the wire 13 opposite the wire section 14 such that, in particular, the position of the wire end 14 remains constant during the process.

FIG. 7 shows a further embodiment of the process, in which the material 11 is fed to the workpiece 10 in the form of a powder 15 by means of a powder source 16 analogously to the embodiment shown in FIG. 5, wherein the powder 15 is melted by means of the laser beam or electron beam 30 such that the respective material layer 12 is formed from the melted material 11.

| | |
|---|---|
| 10 | Pipe fitting, workpiece |
| 11 | Material |
| 12 | Material layer |
| 13 | Wire |
| 14 | Wire section |
| 15 | Powder |
| 16 | Powder source |
| 20 | Welding electrode |
| 21 | Counter electrode |
| 22 | Electric arc |
| 23 | Electrode section |
| 24 | Voltage source |
| 25 | Electrical line |
| 30 | Laser beam or electron beam |
| 31 | Laser source or electron source |
| 40 | Support |
| 100 | Reduction piece |
| 101 | Wall |
| 102 | Interior space |
| 103 | First pipe section |
| 104 | Second pipe section |
| 110 | Pipe elbow |
| 120 | Branch |
| 200 | Device for arc welding |
| L | Longitudinal axis |
| L1 | First longitudinal axis |
| L2 | Second longitudinal axis |
| n1 | First nominal diameter |
| n2 | Second nominal diameter |
| k | Radius of curvature |
| α | Angle |

The invention claimed is:

1. A process for producing a pipe fitting comprising:
producing a first material layer by melting a metallic material by heating, wherein the metallic material is melted by means of heat generated by an electric arc, said electric arc being formed by applying an electrical voltage between a welding electrode and a counter electrode, and
producing a plurality of further material layers in a successive manner on to said first material layer, in each case by melting metallic material,
wherein each produced material layer, after said first material layer, is materially bonded to the previous material layer by means of the heat generated by the electric arc, wherein the welding electrode is formed from the metallic material, and at least one electrode section of the welding electrode is melted by means of the heat generated by the electric arc, and the material layers are each formed from the melted electrode section of the welding electrode,
wherein the metallic material is an aluminum alloy with a proportion by weight of magnesium of at least 2.5%,
wherein the metallic material is provided in the form of a wire and the welding electrode is formed from the wire, and
wherein at least one wire section of the wire is melted by the heating, and the material layers are formed from the melted wire section of the wire to result in the pipe fitting which remains dimensionally stable to a fluid guided through the interior space of the pipe at at least an internal pressure of 10 bar.

2. The process as claimed in claim 1, wherein the pipe fitting is formed as a reduction piece.

3. The process as claimed in claim 2, wherein the reduction piece has two ends and the ratio between the nominal diameters of the two ends of the reduction piece is at least 1.1 to 1.

4. The process as claimed in claim 1, wherein the pipe fitting has a compressive strength of at least 100 bar.

5. The process as claimed in claim 1, wherein the pipe fitting is a conical reduction piece, a pipe elbow, or a branch.

6. The process as claimed in claim 1, wherein the pipe fitting is pipe elbow, having a curvature with a radius of curvature of 2000 cm or less.

7. The process as claimed in claim 1, wherein the pipe fitting has a compressive strength of at least 50 bar.

8. The process as claimed in claim 1, wherein the material layers and the welding electrode can be moved relative to one another.

* * * * *